United States Patent [19]

Bruce

[11] Patent Number: 4,546,451

[45] Date of Patent: Oct. 8, 1985

[54] RASTER GRAPHICS DISPLAY REFRESH MEMORY ARCHITECTURE OFFERING RAPID ACCESS SPEED

[75] Inventor: Robert A. Bruce, Beaverton, Oreg.

[73] Assignee: Metheus Corporation, Hillsboro, Oreg.

[21] Appl. No.: 348,517

[22] Filed: Feb. 12, 1982

[51] Int. Cl.⁴ .............................................. G06F 15/20

[52] U.S. Cl. .............................................. 364/900

[58] Field of Search ................ 364/200, 900; 365/233, 365/235, 73; 340/706, 711, 726, 709, 721

[56] References Cited

U.S. PATENT DOCUMENTS

| | | | |
|---|---|---|---|
| 3,411,142 | 11/1968 | Lee et al. | 364/200 |
| 3,581,290 | 5/1971 | Sugarman | 364/200 |
| 3,641,559 | 2/1972 | Hogan et al. | 364/200 |
| 3,735,383 | 5/1973 | Naka | 340/324 A |
| 3,787,673 | 1/1974 | Watson et al. | 235/156 |
| 3,891,982 | 6/1975 | Check et al. | 340/324 AD |
| 3,969,706 | 7/1976 | Proebsting et al. | 365/233 |
| 4,092,728 | 5/1978 | Baltzer | 364/900 |
| 4,099,259 | 7/1978 | Parsons et al. | 364/900 |
| 4,121,283 | 10/1978 | Walker | 364/200 |
| 4,150,364 | 4/1979 | Baltzer | 340/703 |
| 4,156,905 | 5/1979 | Fassbender | 364/200 |
| 4,197,590 | 4/1980 | Sukonick et al. | 364/900 |
| 4,240,075 | 12/1980 | Bringol | 340/798 |
| 4,243,984 | 1/1981 | Ackley et al. | 340/747 |
| 4,283,765 | 8/1981 | Rieger | 364/520 |
| 4,386,421 | 5/1983 | Inagaki | 365/73 |
| 4,398,264 | 8/1983 | Couper et al. | 364/900 |
| 4,422,160 | 12/1983 | Watanabe | 365/235 |
| 4,442,503 | 4/1984 | Schütt | 364/900 |
| 4,449,199 | 5/1984 | Daigle | 364/900 |

OTHER PUBLICATIONS

"100NS 64K Dynamic RAM Using Efficient Redundancy Techniques", Int. Solid State Circuits Conf., (2-18-81).

"A High Speed Algorithm for the Generation of Straight Lines and Circular Arcs", 1979, IEEE.

"A Cell Organized Raster Display for Line Drawings", Communications of ACM, 2-1974.

*Primary Examiner*—Gareth D. Shaw
*Assistant Examiner*—Tim A. Wiens
*Attorney, Agent, or Firm*—Chernoff, Vilhauer, McClung, Birdwell & Stenzel

[57] ABSTRACT

A raster graphic refresh memory architecture offering increased access speed. The memory takes advantage of the "page mode" of operation of dynamic random-access memory integrated circuit devices which require two separate device addresses for random access to a storage location therein but permit in "page mode" a first address corresponding to a set of storage locations to be maintained while changing the second address for more rapid access. The memory is organized so that a portion of the second device address is allocated to the least significant bits of one dimension of the display address and another portion of the second device is allocated to the least significant bits of another dimension of the display address, thereby forming a two-dimensional cell of storage locations on a single page corresponding to a region on the display. The page can be extended by using a plurality of random-access memory devices and selecting one of the devices using the least significant bits of one dimension of the display address. An addressing scheme is provided which permits simultaneous "page mode" writing of data into multiple storage locations representing contiguous pixels of the display. A mechanism is also provided for reading back data from a plurality of storage locations representing contiguous pixels on the display and storing the data in a temporary storage-shift register for subsequent manipulation.

23 Claims, 19 Drawing Figures

RASTER GRAPHICS DISPLAY REFRESH MEMORY ARCHITECTURE OFFERING RAPID ACCESS SPEED

BACKGROUND OF THE INVENTION

This invention relates to digital graphics display systems, particularly to display refresh memory structures and addressing methods for use in a raster-type graphics display system.

The field of digital computer graphics involves displaying computer-generated images or pictures on a display device such as a cathode ray tube ("CRT"). One way of accomplishing this is to utilize a raster-type display which incorporates as the display device a CRT similar to a television picture tube and generates the image by controlling the intensity of the cathode ray tube's electron beam as it scans the display screen of the CRT in a predetermined pattern of lines or "raster" producing an image formed of a plurality of individual points or "pixels". Raster scan display systems of this type are shown, for example, by Walker, U.S. Pat. No. 4,121,283 and Cheek, et al., U.S. Pat. No. 3,891,982.

As is well understood by those skilled in the art, a raster graphics display system generally comprises, in addition to a raster-type CRT display, a display refresh memory and a graphics computation device. In the bit-per-element type of raster graphics display, which is advantageous because the graphics computation device may operate at a slow rate relative to the display raster, the display refresh memory contains a digital representation of the image to be displayed as individual pixels on the CRT screen, the digital representation of the image to be displayed being a direct mapping from an image stored in the memory to the image which appears on the screen of the CRT. The display refresh memory is continuously read to generate video signals which are applied to the display CRT as it traces out a raster. To provide a continuous and flicker-free display on the CRT this operation, called "display refresh" by those skilled in the art, must be performed at high speed. Raster type displays of this and other types are described in B. W. Jordan and R. C. Barrett, "A Cell Organized Raster Display for Line Drawings," 17 Communications of the ACM 70–77 (Feb. 1974).

The graphics computation device must write the digital representation of the image to be displayed into the display refresh memory, which frequently must be done during the horizontal and vertical scan retrace intervals characteristic of a raster-type display. Since a complex displayed image requires many write operations by the display computation device, the display refresh memory must also be accessed at high speed by the graphics computation device if the display is to be changed or updated rapidly. In many applications, the speed at which the display refresh memory can be read or written therefore places a limit on the speed which the display memory, and thus the displayed image, can be updated.

The "dynamic random-access memory" is a semiconductor memory integrated circuit type which, as is understood by those skilled in the art, is the preferred component from which to construct raster display refresh memories. This is because of its low cost, large number of storage locations or "bits", small size, low power consumption and reasonable read and write access times. However, the speed of dynamic random-access memory is relatively fixed for a given device fabrication technology.

Dynamic random-access memory devices ordinarily require two "row" and "column" addresses, ordinarily in sequence, to select a single storage location therein, the latching of each address taking a certain amount of time. However, memory manufacturers have provided an operation mode for dynamic random-access memory devices called "page mode," which results from the division of the memory locations within a device into large numbers of blocks called "pages", each page corresponding to a single "row" address. Once any memory location within the page has been accessed at normal access speeds, any other memory location on the same page can be accessed at significantly higher speeds than a normal access to an arbitrary memory location by changing only the column address. However, page mode has not heretofore been considered useful in raster display refresh memory systems because of the low probability that memory locations which need to be accessed sequentially by the graphics computation device will fall on the same "page" since the "page" extends in only one dimension of the display memory.

As is shown by Fassbender, U.S. Pat. No. 4,156,905, a method is available for improving access speed in reading a random-access memory comprised of a plurality of random-access integrated circuit memory devices by reading out groups of data into an output register from which the data is more rapidly available. It is nevertheless desirable to utilize the maximum inherent speed of dynamic random-access memory devices, particularly for writing into the refresh memory of a raster graphics display system where rapid changes to the refresh memory can increase the speed at which the displayed image can be updated.

In computer graphics displays, it is often useful to fill a two-dimensional region of the display with a constant value, for example, in clearing the entire display, or a portion thereof, to a background value. This operation involves writing into a large number of display refresh memory storage locations, and thus can be a time-consuming operation which reduces the productivity of the graphics display system. Graphics display refresh memories are generally comprised of a plurality of random-access devices and, as is understood by those skilled in the art, the devices can be read out in parallel and thereafter serialized to obtain sufficient output speed for a video display, the corresponding storage location in each device forming a line of adjacent pixels in a direction parallel to the direction of the display refresh raster scan lines. Simultaneously writing into related storage locations of a plurality of memory devices is also known, as shown by Baltzer, U.S. Pat. Nos. 4,092,728 and 4,150,364. However, the advantage of utilizing this technique in updating a raster graphics refresh memory has apparently not heretofore been recognized, and the speed that can be achieved by reading or writing data to corresponding storage locations in each device simultaneously has heretofore been limited by the inherent random-access speed of the device itself.

Another problem which arises in raster graphics display systems results from certain operations which may be performed by the graphics computation device on data stored in the display memory storage locations. Not only do the same display memory speed limitations which reduce the graphics computation device writing speed also affect its reading speed, but these operations increase the probability of contention for memory access due to the refresh read requirement and the need for the graphics computation device to write into the memory. It is therefore desirable to provide a rapid means of accessing data in the display memory for manipulation by the graphics computation device while reducing the probability of memory contention.

By way of background, other technical references of general interest are: Lee et al., U.S. Pat. No. 3,411,142; Parsons et at., U.S. Pat. 4,099,259; Sugarman, U.S. Pat. No. 3,581,290; and Naka, U.S. Pat. No. 3,735,383; Bringol, U.S. Pat. No. 4,240,075; Hogan et al., U.S. Pat. No. 3,641,559; Watson et al., U.S. Pat. No. 3,787,673; and Suenaga, Kamae and Kobayashi, "A High-Speed Algorithm for the Generation of Straight Lines and Circular Arcs," 28 IEEE Transactions on Computers 728-36 (Oct. 1979).

SUMMARY OF THE INVENTION

The present invention overcomes the aforementioned drawbacks of prior-art computer graphics display memory systems through a memory architecture offering increased access speed and versitility as a result of taking advantage of the page mode of operation of dynamic random-access memory devices, writing into a plurality of memory devices in parallel, and reading data out of a plurality of memory devices in parallel and into a temporary storage shift register.

As is understood by those skilled in the art, a graphics computation device is ordinarily an incremental device, which means that in writing a representation of a graphical entity into the display refresh memory it will sequentially access sets of memory locations which represent contiguous points or pixels in the displayed image or picture. In this invention, the display refresh memory is addressed in such a way that those dynamic random-access storage locations which comprise a "page" within the memory form a contiguous "cell" corresponding to a region of the displayed image. As a result of this addressing technique memory locations which are written sequentially by the incremental graphics computation device are usually on the same memory "page" and thus can be written at high speed using the memory's "page mode" of operation. When a page boundary is crossed, one slower memory access is required to get onto the new page, and the invention provides a technique for detecting the crossing of a page boundary to allow the initial full memory cycle required to gain access to the new page of memory location into which data can be written again at high speed.

In accordance with this invention, rather than organizing memory so that a page corresponds to a row or column of pixels a single pixel wide, address lines to memory devices are arranged so that a memory page maps to a two-dimensional region on the display image, allowing most incremental addressing to occur on a single page and only infrequently requiring a slower memory cycle to cross to another page. (It is recognized that while the vast majority of current graphics displays are two-dimensional, the principles of the invention could apply to a three-dimensional display as well.) This is accomplished by allocating a portion of the column device address of the memory devices to the least significant bits of a first dimension of the display address (the "X" address) and another portion of the column device address to the least significant bits of a second dimension of the display address (the "Y" address) thereby causing the page to map to a rectangular region of the display image.

The crossing of a page boundary is accomplished by detecting changes in the X and Y display addresses that would place the addressed memory location on a new page and, in response thereto, causing a full memory access cycle to occur, that is, providing both row and column device addresses anew. This is implemented by detecting the carry bit of the least significant bits of the X and Y display addresses as they are incremented up or down for tracing a graphical entity on the screen.

Where many memory devices are read out in parallel to provide the high speed necessary for producing a video display signal, the page is extended to include the many devices and the least significant bits of one display address are used to enable one out of the many devices.

In order to fill a rectangular region of a raster display refresh memory at high speed, provision is made for writing into a number of adjacent display refresh storage locations in a single memory access cycle. By use of the page mode addressing technique moves can be made horizontally or vertically to adjacent pixel groups and data written at page mode memory speeds with only occasional full memory access cycles. This is accomplished by utilizing a plurality of memory devices which are write enabled simultaneously.

In addition, the invention provides a technique for allowing a number of adjacent memory locations to be read into a temporary storage device during a single memory access cycle for subsequent manipulation by a graphics computation device. In reading from one portion of the memory and writing to another, for example in changing the position of an image on the display, the page mode technique described and claimed herein would not be usable if the memory had to be addressed (most likely to another page) after each write to read another pixel of data, that is a full row-column memory cycle would be required for each write. By providing a temporary storage-shift register a set of data representing contiguous pixels on the display can be read out simultaneously during one memory cycle thereby reducing contention with the refresh read requirement and the graphics computation device for the display memory. By shifting and circulating the data in the temporary register, the data may thereafter be read out in any desired order at the convenience of the graphics computation device.

Accordingly, it is a principal objective of the present invention to provide an improved method and apparatus for accessing the display memory of a computer graphics display system.

It is another principal objective of the present invention to provide such a method and apparatus which is particularly suitable for a raster-type display system.

It is another objective of the present invention to provide such a method and apparatus for utilizing "page mode" operation of dynamic random-access memory devices to greatly increase the display memory access speed.

It is yet another objective of the present invention to provide a method and apparatus for increasing the rate at which data may be simultaneously written into a plurality of graphics display memory storage locations representing contiguous pixels on the graphics display.

It is a further objective of the present invention to provide a method and apparatus for reading into a temporary storage location a set of data in a graphics display memory in order to reduce memory contention and increase the speed of display update.

The foregoing and other objectives, features and advantages of the present invention will be more readily understood upon consideration of the following detailed description of the invention taken in conjunction with the accompanying drawings.

DETAILED DESCRIPTION OF THE PREFERRED EMBODIMENT

Figure 1:
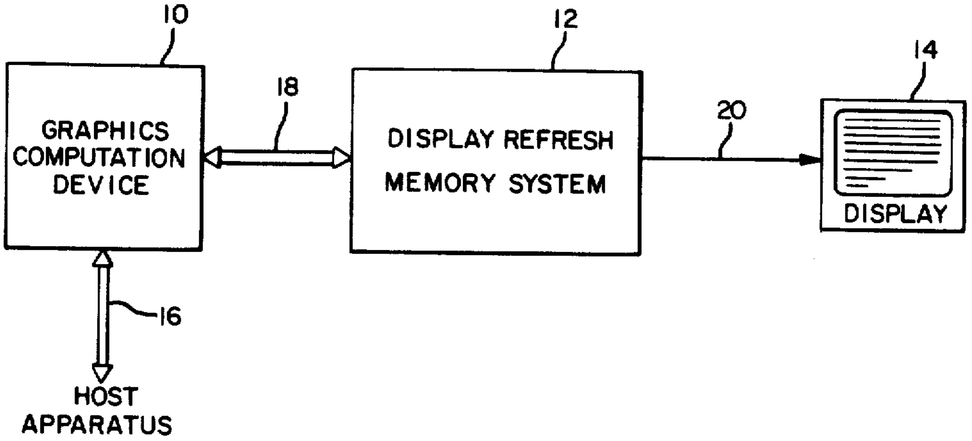
FIG. 1 shows a simplified block diagram of a raster graphics display system of the type employing the present invention.

Referring to FIG. 1, a digital graphics display system of the type employing the present invention typically comprises a graphics computation device 10 (hereinafter referred to as "GCD") which computes information necessary for graphical display of an image, a display refresh memory system 12 which stores a digital representation of the image to be displayed and permits periodic refreshing of the displayed image, and a raster-type CRT display device 14 which produces a visual display of the graphical image comprised of a two-dimensional array of "pixels". The GCD 10 typically communicates via an input/output (I/0) interface 16 with a host apparatus which provides graphics requests, and communicates with the display refresh memory system 12 by, among other things as hereinafter explained, providing information 18 such as display memory addresses, graphics data to be stored in the display memory, and requests to write data into the display memory. The display refresh memory system 12 provides a video output 20 to the raster-type CRT display device 14.

Figure 12A:
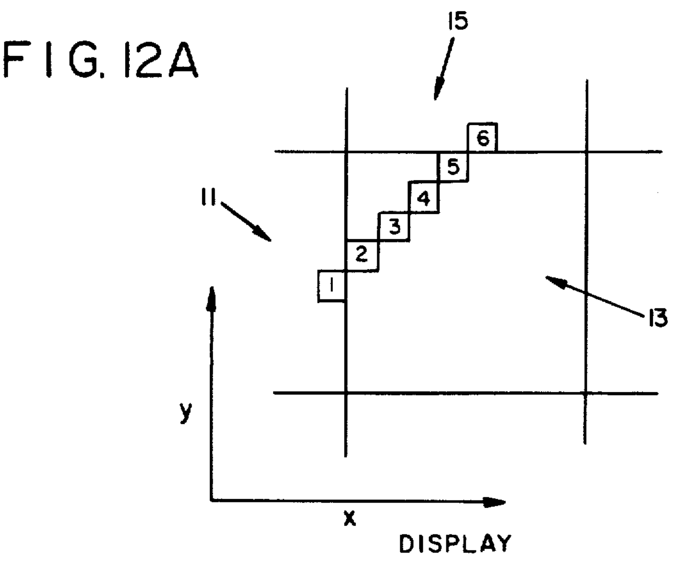
FIG. 12A shows six exemplary pixels on a two-dimensional display.

The GCD 10 receives instructions from the host apparatus describing a graphical entitity which is to be displayed, for example, lines (or vectors), curves, characters and symbols, and regions such as polygons to be entirely filled. FIG. 12A illustrates such an example where a line is represented by pixels 1–6 lying in three two-dimensional regions 11, 13, and 15 of a display. The GCD uses the description of a graphical entity to compute the locations within the memory of the display refresh memory system 12 into which data must be written to produce a display of the desired graphical entitity. Such a GCD is ordinarily an incremental device, which means that in writing a representation of the graphical entitity into the memory, it will sequentially access memory locations which represent neighboring points in the displayed image. Although the display refresh memory architecture of the present invention provides features heretofore unavailable, the construction and operation of a GCD which could take advantage of the features of the invention is well understood by those skilled in the art, as is the construction and operation of a raster-type CRT display device.

Figure 12B:
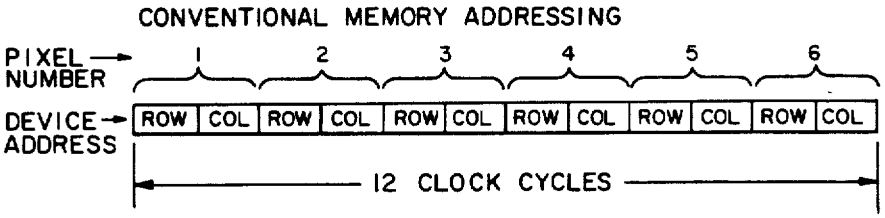
FIG. 12B illustrates a sequence of six memory access events for writing data into storage locations corresponding to the six pixels shown in FIG. 12A in a conventional memory system.

A typical dynamic random-access memory device ("RAM") contains a plurality of one bit data storage locations arranged in a two-dimensional array, each location being selected by a combination of a "row" address and a "column" address. (The terms "row" and "column" ordinarily have no significance other than to identify the two distinct addresses required to select a given storage location.) These addresses are typically received by the device on the same inputs, the address being time-multiplexed so that the device first receives the row address and thereafter receives the column address for access to a random storage location therein. As is illustrated by FIG. 12B, each write operation in a sequence of six memory access events in a conventional memory system requires both a row and a column address, resulting in the use of 12 clock cycles to write into the memory data corresponding to the six pixels of FIG. 12A.

However, due to the design of such a RAM device, storage locations corresponding to a given row address (which form a "page" of the memory device) may be accessed approximately twice as fast as random storage locations as long as the same row address is maintained while the column address is changed, thereby providing the "page mode" operation of the device. An example of such a device is a 65,536-bit ("64K") dynamic random-access memory integrated manufactured by Texas Instruments Corporation, Dallas, Tex., and distributed under the nomenclature TMS 4164 JDL.

Figure 2:
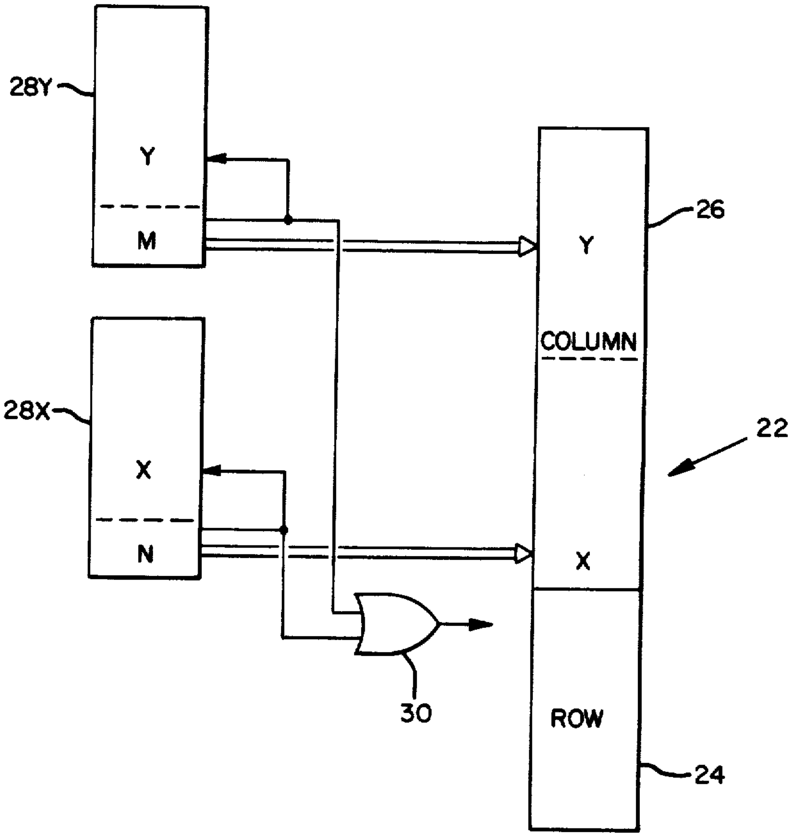
FIG. 2 is a generalized block diagram illustrating a principal concept of the present invention.
Figure 13:
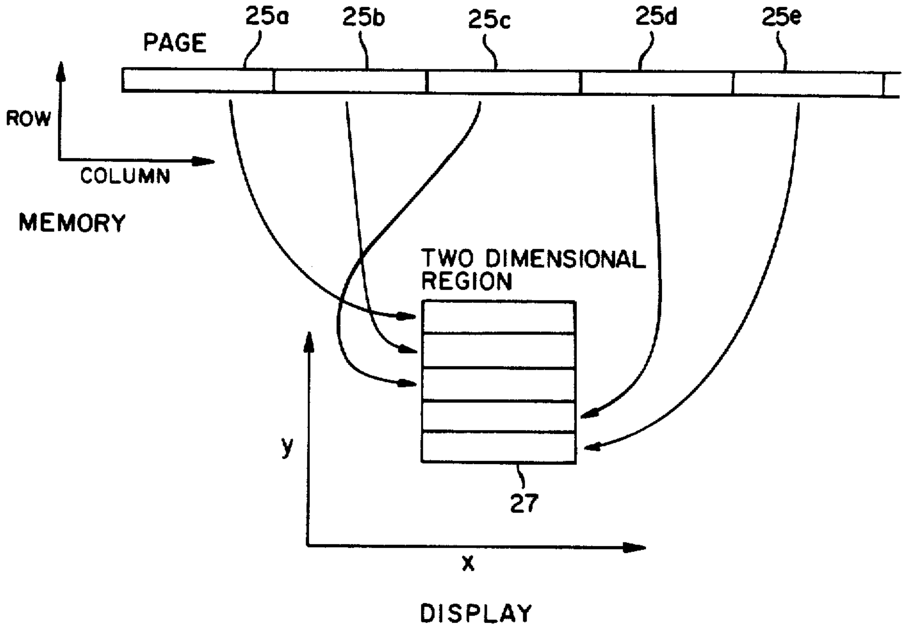
FIG. 13 illustrates the mapping of storage locations on one page of a page mode device to a two-dimensional region of a display according to the present invention.

Turning now to FIG. 2, which illustrates a principle concept to the invention, the row and column RAM device addresses are provided by a multiplexer 22 comprising a row address section 24 and a column address section 26. For a two-dimensional display, as is contemplated by tne preferred embodiment of the present invention, a first dimension of the display (hereinafter referred to as the "X" dimemsion) and a second dimension (hereinafter referred to as the "Y" dimension) are provided to display address registers 28X and 28Y, respectively. A portion of the RAM device column address is allocated to the first n least significant bits of the X display address and another portion of the column address is allocated to the first m least significant bits of the Y display address, thereby defining an n×m cell on one page of the device which maps to a corresponding region on the graphics display. FIG. 13 illustrates the foregoing, the sets of storage locations **25*a*–25*e* on the one-dimensional page of a RAM device being mapped to the two-dimensional region 27** of the display.

Figure 12C:
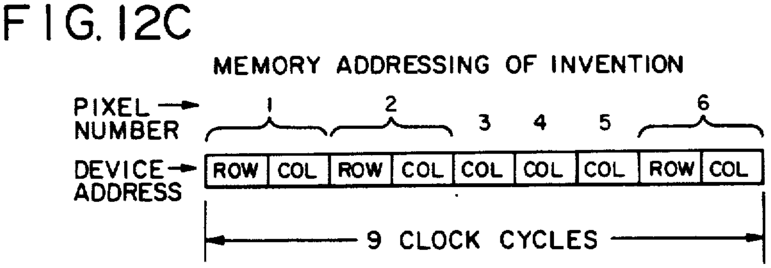
FIG. 12C illustrates a sequence of six access events for writing data into storage locations corresponding to the six pixels shown in FIG. 12A in a memory system according to the present invention.

As display memory locations are accessed sequentially, it is necessary to detect when access to a new location has passed a page boundary so that a different row address can be provided to the memory. As is illustrated by FIG. 12C, this addressing scheme only requires nine clock cycles to write into memory data representing the line of sic pixels in FIG. 12A, which lie in three distinct two-dimensional regions 11, 13, and 15 of the display, since the storage locations corresponding to the four pixels 2–5 lying in region 13 share a common row address.

Although the detection of when access to a new location has passed a page boundary could be done in various ways, for example, by comparing each display address to its predecessor, it is anticipated that the vast majority of applications would involve incrementing the X and Y display addresses up and down for tracing a contiguous image on the display, as is well known in the art. Consequently, the display address registers 28X and 28Y would preferably comprise counters for incrementing those addresses up and down. In that case, the crossing of a page boundary can be determined by detecting the carry bit from the least n significant bits of the X register and from the least m significant bits of the Y register by a page change detector circuit 30.

Although this technique has been described in terms of a single RAM device, it can also be used to advantage when, as is typical, the memory is formed of a plurality of dymanic RAM devices which are read out in parallel and loaded into a shift register for high speed shifting to produce a video signal, as is commonly known in the art. In that case, the "page" is extended to include many RAM devices and the least significant bits of the X display address are used to write enable one of several RAM devices while the least significant bits of the Y register are used to select the column within a page. Various combinations of least significant bits of the X address and the Y address could be used to select a particular RAM device and a particular column within that device, so that various size rectangular cells within a memory page are possible. Also, while the invention is particularly applicable to dynamic RAM integrated circuits, the application of the novel principles described herein to any memory device having the same characteristics, including a combination of integrated circuits, would fall within the scope of this invention.

While all memory locations within a cell must be contained on a single page, it is not true that a cell must contain an entire page. A particular dynamic RAM device or memory system consisting of several RAM devices might contain far more than 256 storage locations on a given page. To obtain the benefits of this invention it is not necessary that all of thése storage locations be organized to form a single cell; other memory design considerations might indicate that cells be somewhat smaller than a whole page. Moreover, while a square cell is the preferred embodiment of this invention, cells of other shapes are also practical. In order to obtain the benefits of significant increases in display refresh memory update speed through use of this invention, it is only necessary that the cells extend in at least two dimensions, that is, that they be more than one memory location wide in each display dimension, although the larger the cells, the larger the percentage of memory accesses which can be made in page mode. In fact, it has been found that a 16×16 cell offers most of the speed improvement possible.

Figure 3:
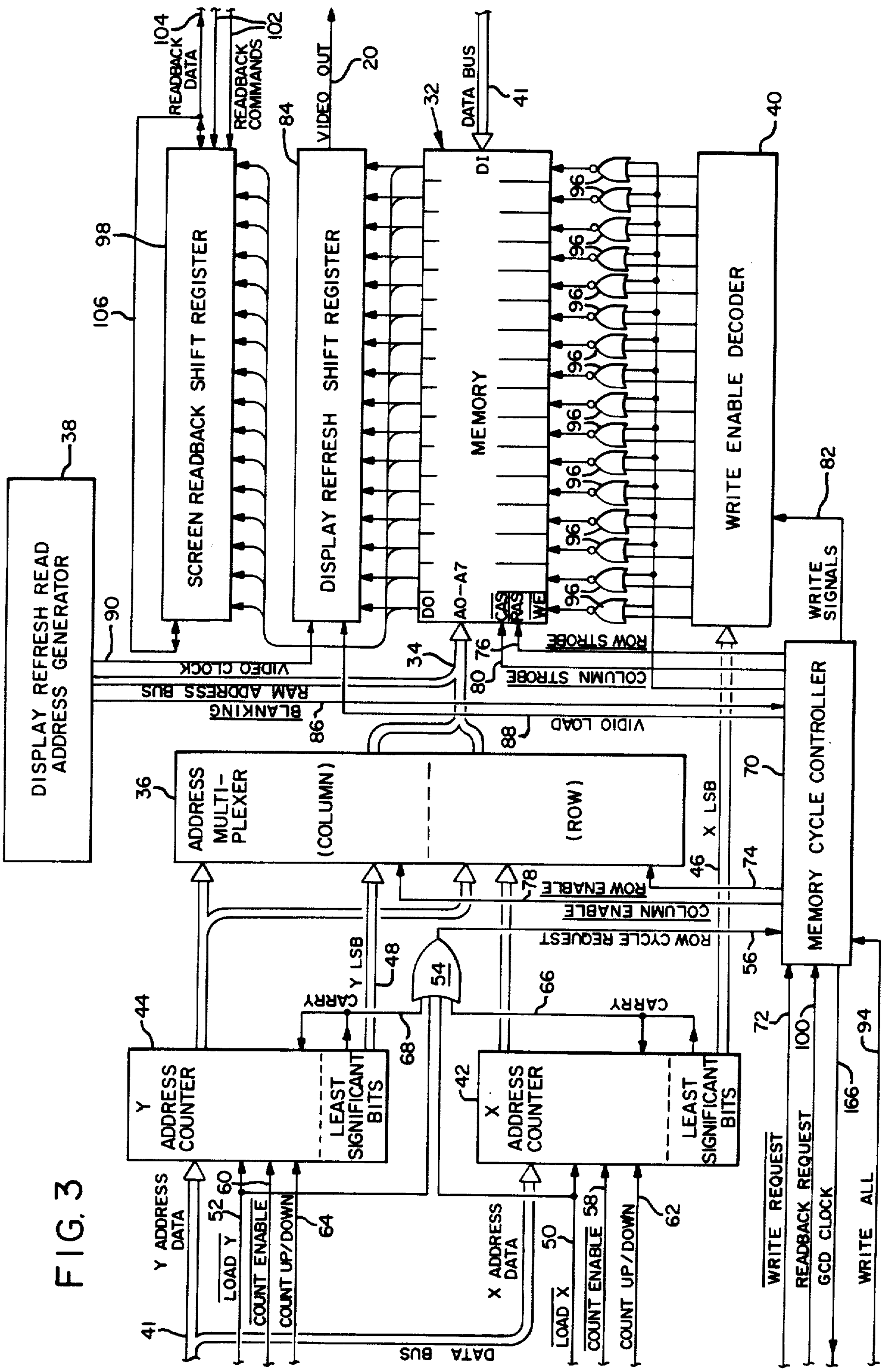
FIG. 3 shows a simplified block digram of a preferred embodiment of the present invention.

A simplified block diagram of the preferred embodiment of the invention is shown in FIG. 3. While this diagram and the subsequent schematic diagram referred to herein illustrate only one bit plane of a graphics display memory system, it is to be understood that multiple bit planes of the same design can be provided for producing various intensity-color combinations. The memory 32 of rhe system is formed of a plurality, in this case 16, dynamic RAM devices. The memory receives its row and column device addresses on a RAM address bus 34 from either an address multiplexer 36 for writing data into memory or reading data back to create graphics, or a display refresh read address generator 38 ("DRRAG") for periodically reading data to the CRT display. The particular RAM device is selected by the output of a write enable decoder 40.

For writing data into the display memory, the graphics computation device inputs X address data to an X address counter 42 and Y address data to a Y address counter 44 via data bus 41. The outputs 46 from the least significant bits of the X address counter, specifically the first four bits in the preferred embodiment, go to the write enable decoder 40 to select one of 16 RAM devices. The outputs 48 from the least significant bits of the Y address counter, specifically the first four bits in the preferred embodiment, go to the column register of the memory address multiplexer 36 for selecting one of 16 columns in each RAM device, thereby defining a 16×16 bit memory cell corresponding to a region of pixels on the graphics display. The remaining bits of the X display address counter and the Y display address counter are utilized to select the row device address and remaining portion of the column device address, it being generally unimportant how they are combined.

Upon receipt of a $\overline{\text{LOAD}}$ X signal 50 or a $\overline{\text{LOAD}}$ Y signal 52 from the GCD a new address is loaded into the corresponding address counter. Since there is a high probability that a new address will involve crossing a page boundary, these signals are detected by an OR gate 54 to produce a ROW CYCLE REQUEST 56, which indicates that the next memory cycle must provide for a random storage location selection. As a graphics entity is incrementally computed, each counter may receive respective COUNT UP/DOWN signals 62 and 64 and $\overline{\text{COUNT ENABLE}}$ signals 58 and 60, causing the counter to count the address up or down depending upon the COUNT UP/DOWN signal, and when the incrementing or decrementing of either counter produces a respective $\overline{\text{CARRY}}$ signal, 66 or 68, respectively, from the least significant bits, the OR gate 54 also produces a row cycle request. (Throughout this description a bar over a signal indicates that the signal is "true" when low.)

Operation of the memory system is controlled by a memory cycle controller 70. Upon receipt of a $\overline{\text{WRITE REQUEST}}$ 72 from the GCD the memory cycle controller issues a ROW $\overline{\text{ENABLE}}$ signal 74 to the address multiplexer 36 and a ROW $\overline{\text{ADDRESS STROBE}}$ ("$\overline{\text{RAS}}$") 76 to the memory 32, assuming that a ROW CYCLE REQUEST has been made, and in any case a $\overline{\text{COLUMN ENABLE}}$ signal 78 is issued to the address multiplexer and a $\overline{\text{COLUMN ADDRESS STROBE}}$ ("$\overline{\text{CAS}}$") 80 is issued to the memory and $\overline{\text{WRITE}}$ signals 82 are issued to the write enable decoder 40 which enables the proper RAM device for selection thereof.

In a raster-type display system of this type the memory must be read not only to produce a video output representing a new image, but it must be read periodically to refresh the CRT display. This function is carried out by the DRRAG 38 and a display refresh shift register 84 which simultaneously accepts data from each of the 16 RAM devices corresponding to 16 adjacent pixels of the display and shifts the data out serially at a much higher rate to produce the video output 20. In response to a $\overline{\text{BLANKING}}$ signal 86 from the DRRAG 38, the memory cycle controller 70 inhibits GCD memory access and issues a series of $\overline{\text{VIDEO LOAD}}$ signals 88 to the display refresh shift register 84, the data in the register being periodically shifted out in response to a $\overline{\text{VIDEO CLOCK}}$ signal 90.

In some instances it is desirable to write the same data into a plurality of locations simultaneously, for example when an entire region is to be filled with the same data. Upon receipt of a WRITE ALL signal 94, along with a WRITE REQUEST from the GCD, the memory cycle controller 70 causes all 16 RAM devices to be enabled simultaneously, by a mechanism illustrated by the OR gates 96.

In order to access sets of adjacent data from the memory for manipulation by the GCD, a screen readback shift register 98 is provided. In response to a READBACK REQUEST 100 from the GCD the memory cycle controller 70 issues the necessary commands to read the data into the screen readback shift register 98. In order for this to occur, the graphics computation device must also have provided the appropriate display address for a set of 16 pixels to the X and Y counters. The screen readback shift register itself is responsive to a READBACK COMMAND 102 for loading. Once data has been read back into the screen readback shift register it may be manipulated directly by READBACK COMMANDS 102 from the GCD. These commands can cause the data in the register to be shifted out from either direction as a DATA signal 104 or to be shifted around a circular path 106 in either direction, thereby permitting any data in the register to be reordered or accessed in any order.

Figures 4, 10:
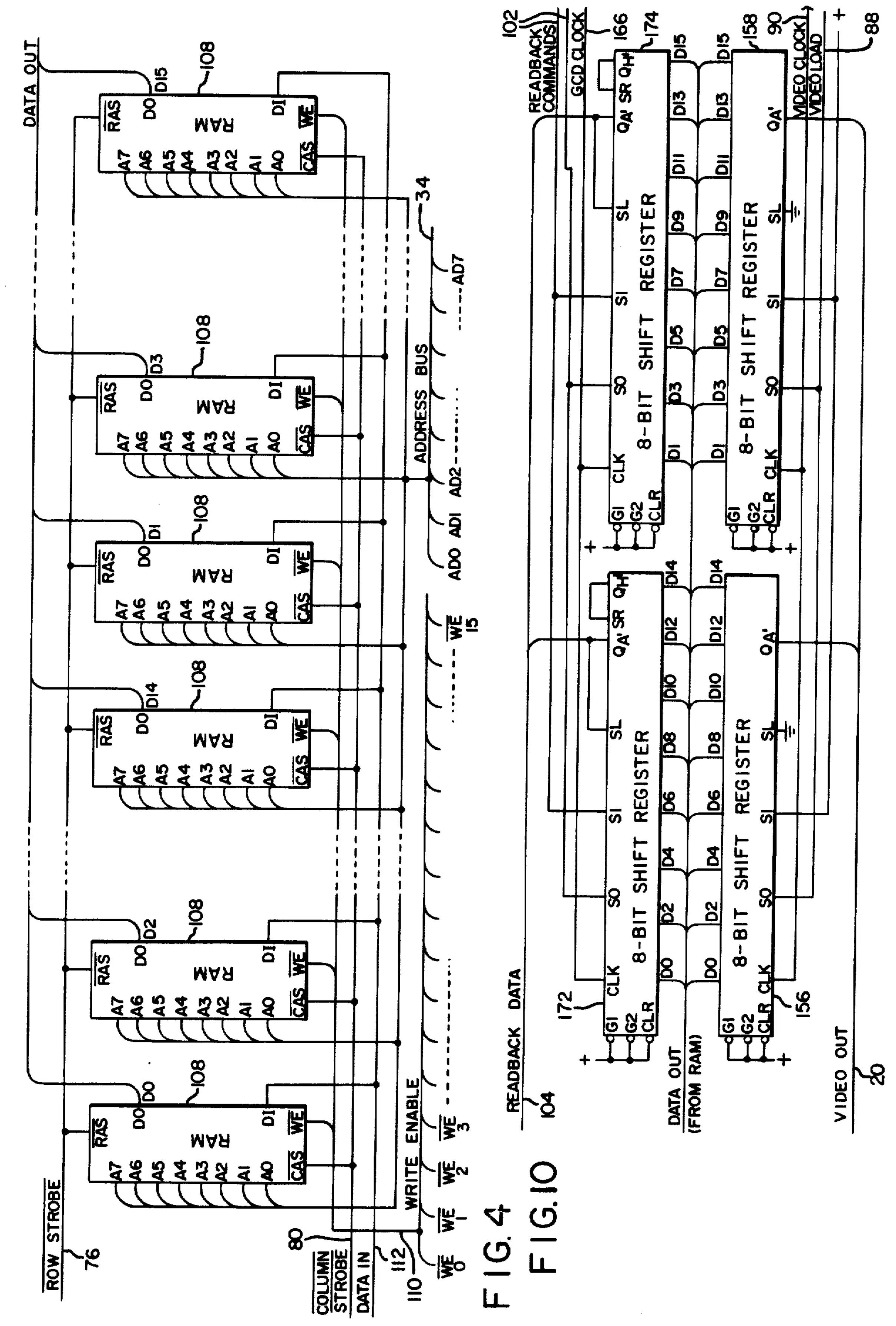
FIG. 4 shows a one bit plane memory circuit portion of a schematic diagram of the preferred embodiment.
FIG. 10 shows a one bit plane readback register portion of the schematic diagram of said preferred embodiment.
Figure 5A:
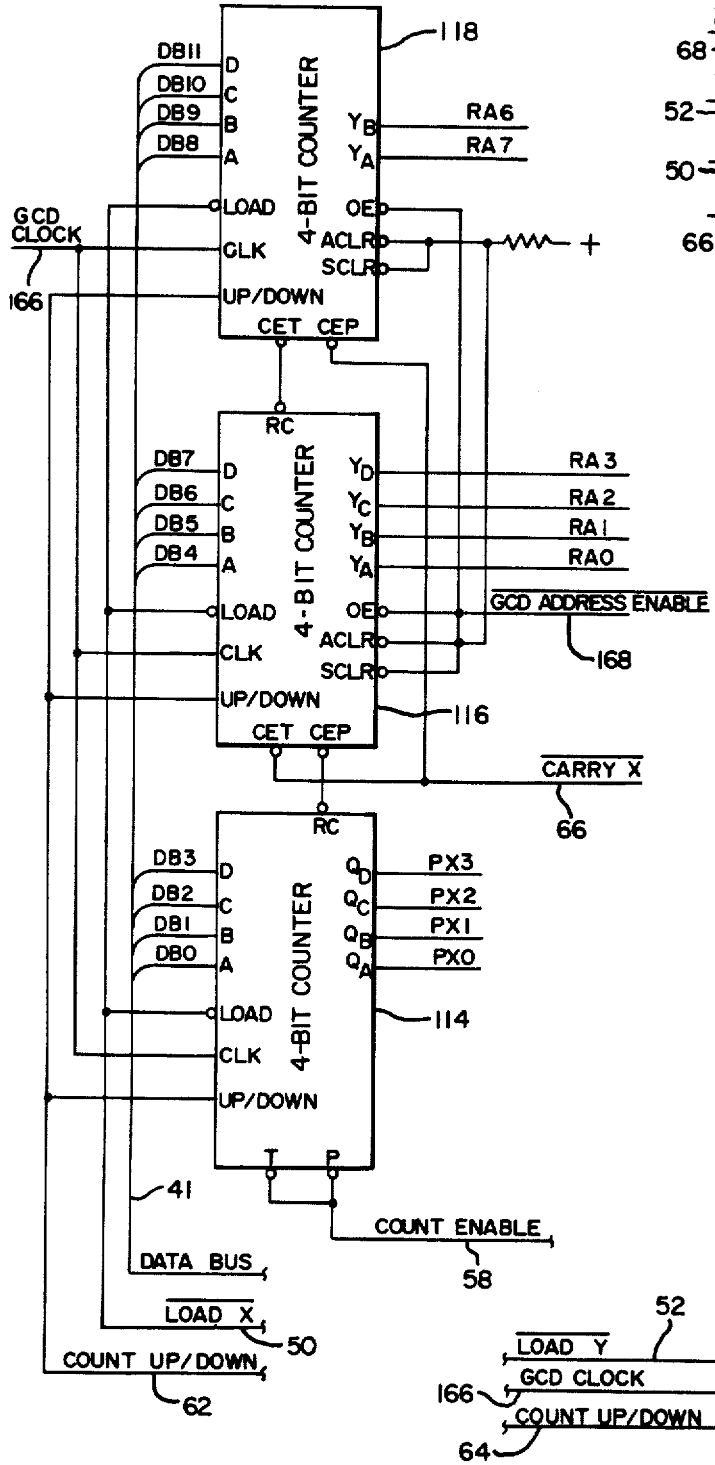
FIG. 5A shows a first display address input register portion of the schematic diagram of the preferred embodiment.

Referring to FIG. 4, as well as FIG. 3, the one bit plane memory 32 is preferably made of sixteen "64K" integrated circuit dynamic RAM devices 108, for example the aforementioned Texas Instruments TMS 4164 JDL. Dynamic RAM devices of the type utilized in the preferred embodiment have a $\overline{\text{RAS}}$ input which tells the device that the values on the address inputs ("A0–A7") correspond to a row address, a $\overline{\text{CAS}}$ input which tells the device that the signals on the address inputs correspond to a column address, and a write enable input ("$\overline{\text{WE}}$") which enables the device so the data provided to it is written into the storage location selected by the addresses. In addition, such a device includes a one-bit data input ("DI") and a one-bit data output ("DO").

To randomly select a storage location in the device, the row address is provided and the $\overline{\text{RAS}}$ input is pulled low, the column address is thereafter provided and the $\overline{\text{CAS}}$ input is pulled low, which causes the data in the selected storage location to location to appear on DO (provided that $\overline{\text{WE}}$ has not been pulled low). To write data into a randomly selected location, the same sequence is followed and $\overline{\text{WE}}$ is pulled low for a predetermined period of time before either the $\overline{\text{CAS}}$ or $\overline{\text{RAS}}$ goes high, which causes the data on DI to be written into the selected storage location. Page mode is implemented by maintaining a low on the $\overline{\text{RAS}}$ input. Although the specific devices shown have been chosen for the preferred embodiment, it is recognized that other dynamic RAM devices having the same characteristics, particularly the page mode operation, could be utilized in implementing the invention. Also, while addresses are ordinarily provided by making the address available on the address inputs and thereafter latching the address with a $\overline{\text{RAS}}$ or a $\overline{\text{CAS}}$, other means for providing addresses to a suitable RAM device might be utilized without departing from the principles of this invention.

In order to write data into the memory at random, the memory receives a row address on the address bus 34, a $\overline{\text{RAS}}$ 76, a column address on the address bus, and a $\overline{\text{CAS}}$ 80, and one of sixteen $\overline{\text{WE}}$ signals 110, which selects one of the sixteen RAM devices 108. The data on DATA IN 112 is then written into the addressed location in the enabled device. In page mode, the $\overline{\text{RAS}}$ 76 stays low, but the address bus 34 provides new column addresses and the $\overline{\text{WE}}$ signals select one of the sixteen chips. To read the memory, row and column addresses from the address bus are strobed in upon request from the GCD or the DRRAG.

Turning now to FIGS. 5A through 5D, a display address is received from the GCD via the data bus 41 and presented to a set of 4-bit X address counters 114, 116 and 118. In response to a $\overline{\text{LOAD X}}$ command 50 from the GCD this address is loaded into the counters. Similarly, a Y display address is loaded into a set of counters 120, 122 and 124 from the data bus 41 in response to a $\overline{\text{LOAD Y}}$ command 52. The least significant bits from the output of the X address counter 114 ("PX0–PX3") are input to a pair of decoders 126 and 128 which, in response to appropriate $\overline{\text{WRITE}}$ signals, generate a write enable signal ("$\overline{\text{WE0}}$–$\overline{\text{WE15}}$") for selecting one of the sixteen RAM devices. The least four significant bits of the Y address output from counter 120 ("CA0–CA3") are received by a column memory driver 130, which is part of the address multiplexer 36, as the first four bits of the column address for the RAM devices. The remaining address output bits from the X counters 116 and 118 ( "RA0–RA3" and "RA6–RA7") and the remaining address output bits from the Y counter 122 and 124 ("RA4–RA5" and "CA4–CA7") are received by the memory driver 130 for producing the rest of the column address and another memory driver 132 (also part of the address multiplexer) for generating the row address for the memory devices, there being no conceptual importance to the order of the remaining bits.

Figure 6:
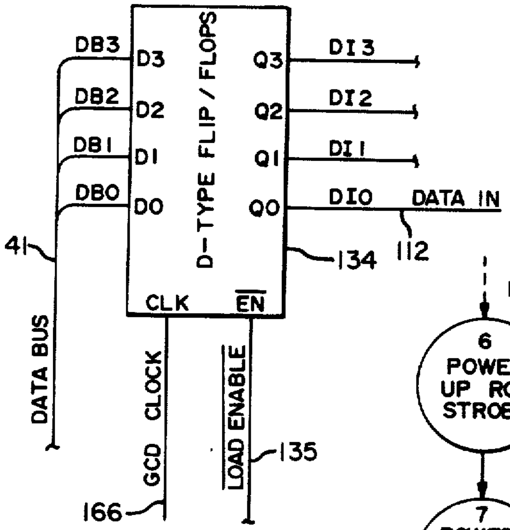
FIG. 6 shows a data load portion of the schematic diagram of the preferred embodiment.

Referring to FIG. 6, DATA IN 112 is provided to the memory plane from the data bus 41 via a set of flip-flops 134 in response to a $\overline{\text{LOAD ENABLE}}$ signal 135 from the GCD. An actual apparatus utilizing the preferred embodiment of the invention described herein would ordinarily have more than one bit plane, for each of which data would be provided, as illustrated for example by the four DATA IN signals provided by flip-flops 134.

Figure 7:
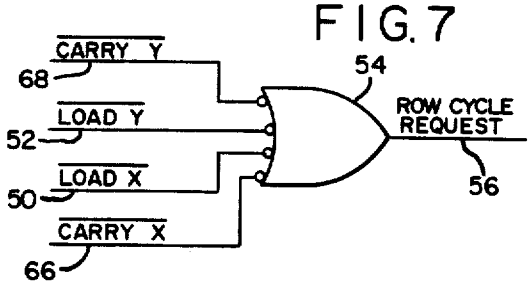
FIG. 7 shows a cell boundary crossing detector portion of the schematic diagram of the preferred embodiment.
Figure 5B:
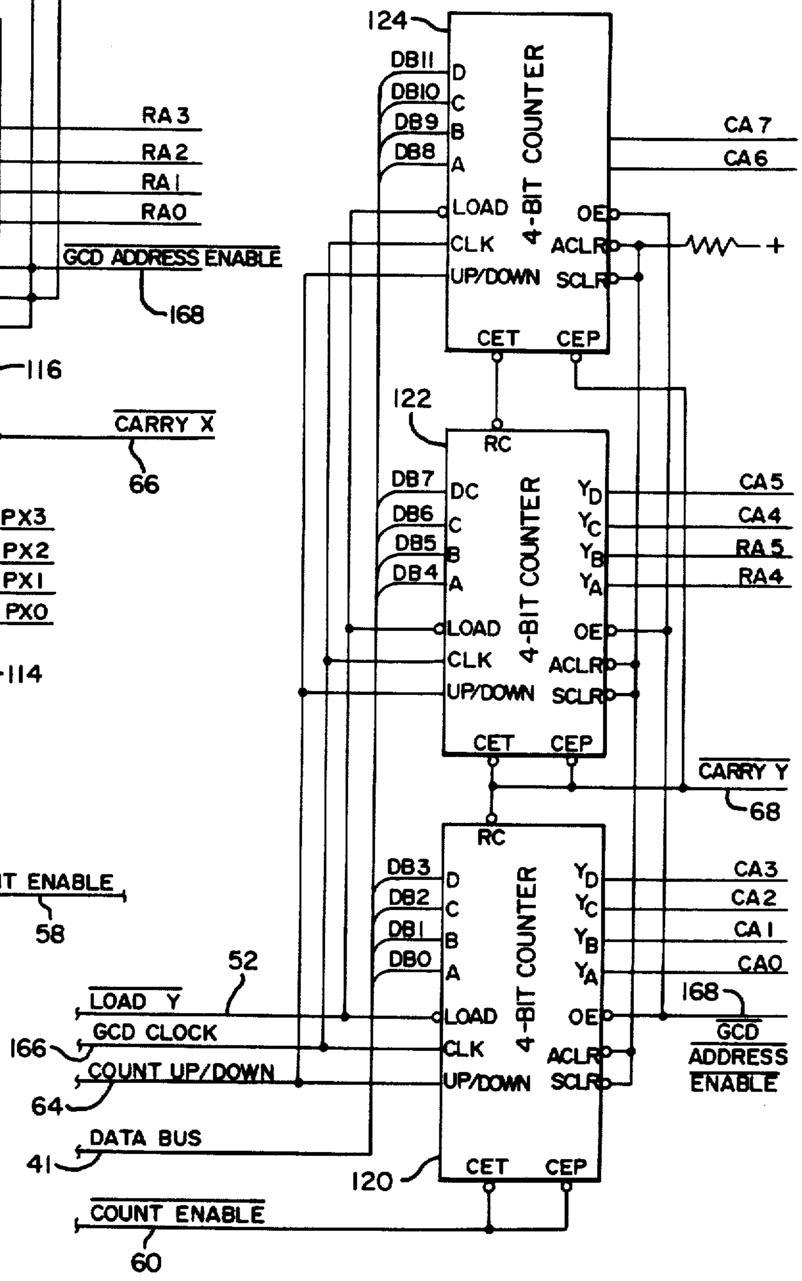
FIG. 5B shows a second display address input register portion of the schematic diagram of the preferred embodiment.
Figure 5C:
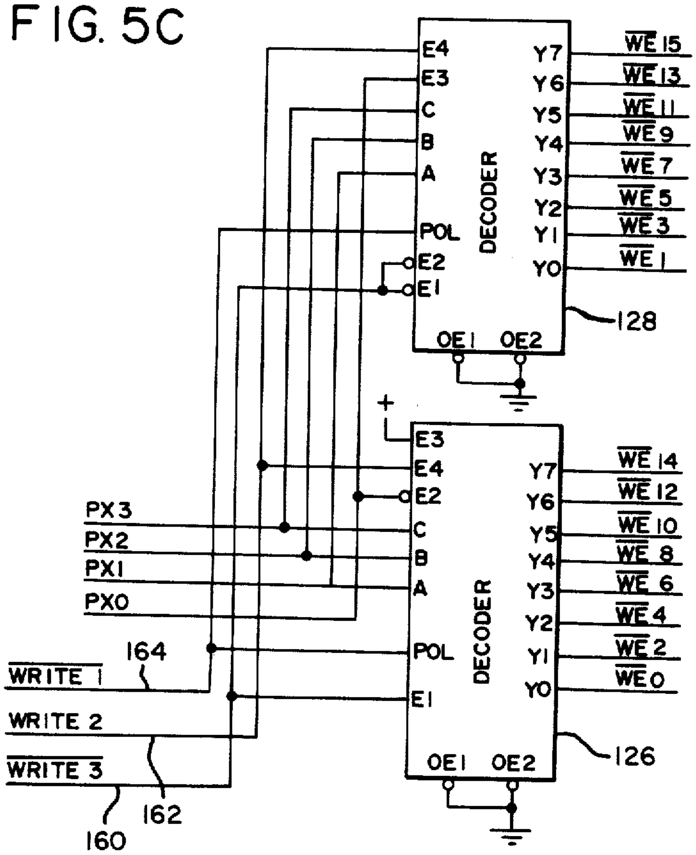
FIG. 5C shows a decoder portion of the schematic diagram of the preferred embodiment.
Figure 5D:
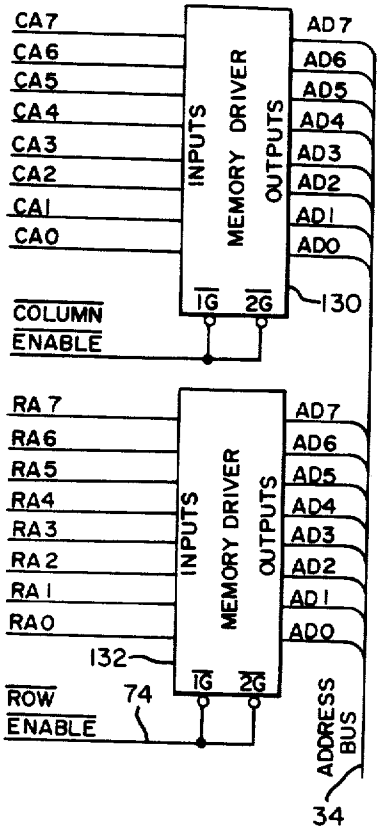
FIG. 5D shows a multiplexer portion of the schematic diagram of the preferred embodiment.

Each time a new X or Y display address is loaded into the respective counter by the GCD the OR gate 54 detects a LOAD X signal 50 or a LOAD Y signal 52 and produces a ROW CYCLE REQUEST 56, as shown in FIG. 7. Under these circumstances there is a high probability that the new address will be on a new page of memory, so a complete random-access memory cycle is executed, requiring the provision of a row device address and a column device address and respective RAS and CAS signals.

Ordinarily the GCD incrementally compures a contiguous graphics entitity by loading X and Y addresses in their respective counters 42 and 44 and incrementing the counters up or down. The X counter is incremented up or down in response to the GCD by a combination of a COUNT UP/DOWN 62 and a COUNT ENABLE 58 applied to the 4-bit counters 114, 116 and 118. Similarly, the Y counter is incremented by application of a combination of a COUNT UP/DOWN 64 and a COUNT ENABLE 60 applied to counters 120, 122 and 124. When, in the process of incrementing, CARRY X 66 is produced by the carry output of counter 114 or a CARRY Y 68 is produced by the carry output of counter 120, the OR gate 54 also produces a ROW REQUEST 56.

Figure 9:
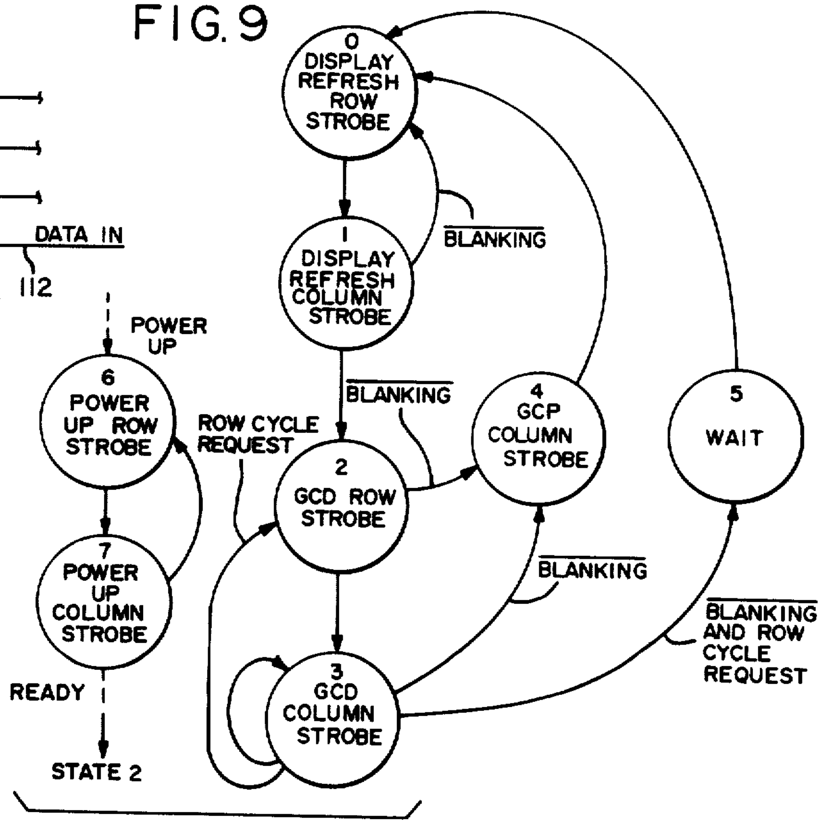
FIG. 9 shows a state diagram of the operation of the memory cycle controller portion of the preferred embodiment.
Figure 8:
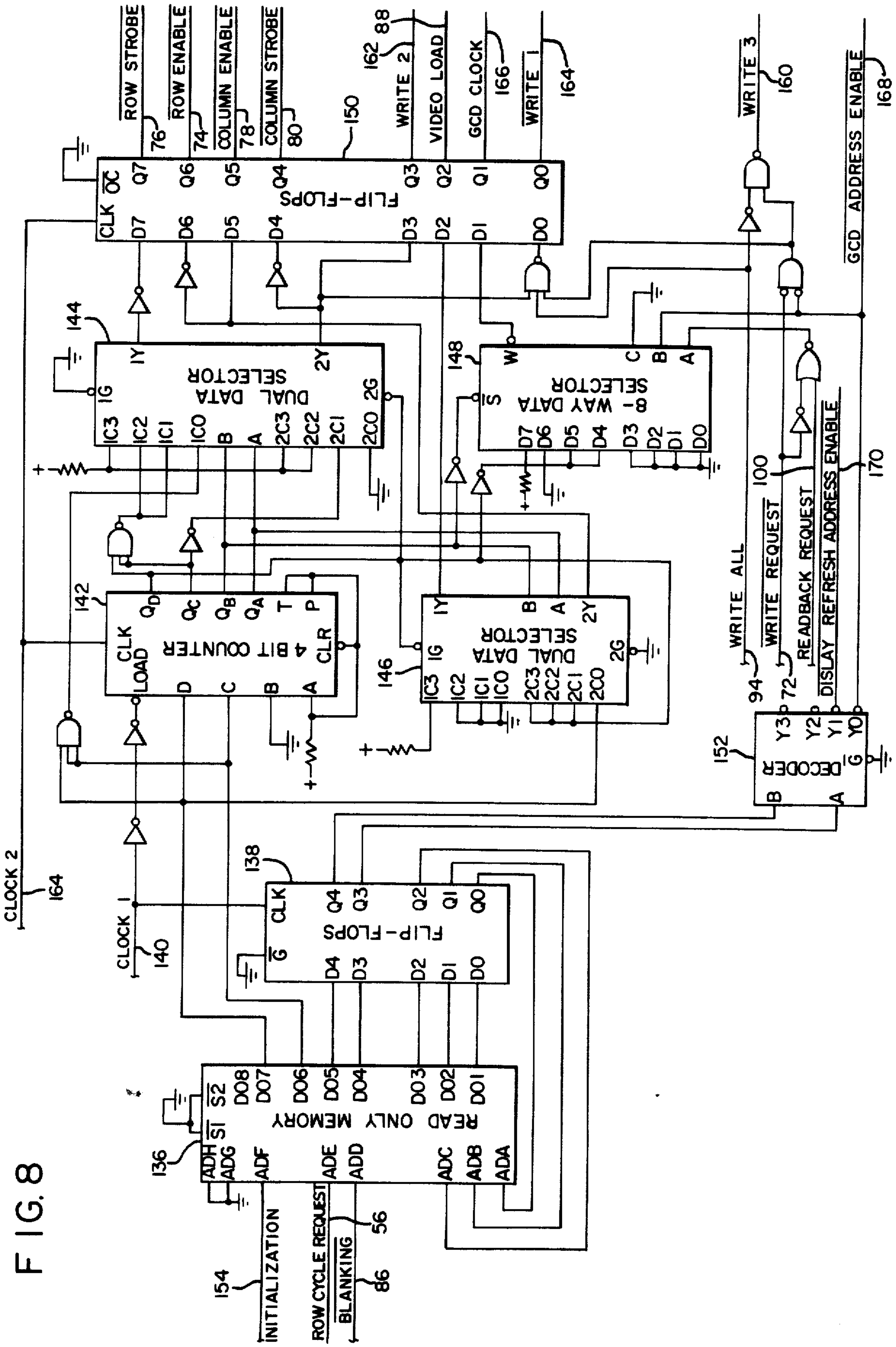
FIG. 8 shows a memory cycle controller portion of the schematic diagram of the preferred embodiment.

The operation of the preferred embbdiment of the memory system is controlled by a memory cycle controller 70 having a circuit of the type shown in FIG. 8. Although the circuit of FIG. 8 performs the necessary tasks in a satisfactory manner, many different suitable logic circuits for performing the same functions could be designed by a person skilled in the art. In this embodiment operation of the memory cycle controller is governed by a sequencer circuit comprising read-only memory 136 ("ROM") having a microcode program stored therein and a set of flip-flops 138. The sequencer may take on any of eight different states, as shown in FIG. 9.

Inputs ADA through ADE of the ROM 136 determine the output code D01 through D07, which controls the operation of the system. Outputs D01-D03 represent the next state of operation and outputs D04-D07 provide signals for producing the desired results for the next state. Sequential execution of the microcode is brought about by the flip-flops 138 which, in response to CLOCK 1 signal 140 (derived from any appropriate source) apply the current state to ROM inputs ADA-ADC as a result of which, depending upon the current state and inputs ADD-ADF, a new microcode output may be produced at outputs D01-D07. A suitable microcode for implementing the invention is shown in Table 1 hereof, though operation of a circuit such as this is commonly known in the art as is the generation of an appropriate microcode.

It should be recognized that other logical functions unrelated to the invention but desired for operation of an apparatus utilizing a graphics display memory system could be controlled by the sequencer by expanding the microcode and providing additional inputs and logic circuitry. For example, under some circumstances it may be desirable to read out only a portion of the raster graphics display memory during a display refresh cycle, which requires periodic refreshing of the dynamic RAM devices themselves, as is commonly known in the art. Ordinarily this is accomplished by the periodic reading of the entire memory for display refresh. RAM refresh as well as other features similarly unrelated to the invention described and claimed herein could be readily implemented via microcode in the sequencer by a person skilled in the art.

The microcode output signals D06-D07 are utilized by a 4-bit counter 142, a dual data selector 144, a dual data selector 146, an 8-way data selector 148, a set of flip-flops 150, a decoder 152, and other ancillary logic devices shown in FIG. 8 to produce appropriate logic signals for implementation of the invention as hereinafter described. It is to be recognized, however, that this specific logic circuitry of the controller is simply a matter of design choice understood by persons skilled in the art and requires no detailed explanation, there being a variety of different ways to produce the same output signals.

Referring to the state diagram in FIG. 9, a practical apparatus of this type typically requires an initialization period when the power is first turned on. Consequently the memory cycle controller circulates between states 6 and 7 until an initialization signal 154 is received, indicating that ancillary equipment is ready to operate. It then shifts first to state 2.

In the absence of a BLANKING signal, the controller produces a RAS and then moves on to state 3 which produces a CAS so that new data may be written into the memory upon receipt of a WRITE REQUEST 72. In the absence of a ROW CYCLE REQUEST or a BLANKING signal the controller stays in state 3. However, the appearance of a BLANKING signal will send the controller to state 0 either through state 4, during which a column strobe may occur, or through state 5, in the case that a ROW CYCLE REQUEST has occurred, there being insufficient time to write into a new page of memory. Thereafter, in response to a BLANKING signal 86 from the DRRAG 38, the controller circulates between states 0 and 1 during which time the VIDEO OUTPUT 20 is produced to refresh the display, which also refreshes the dynamic RAM devices.

Referring to FIG. 10, a VIDEO LOAD signal 88 is also generated by the controller for loading the output of the RAM devices into two 8-bit shift registers 156 and 158 which comprise the display refresh shift register 84. The data in the shift registers is then shifted out serially in response to the VIDEO CLOCK 90. This is repeated until all storage locations to be displayed have been read, thereby producing the video output signal 20.

Figure 11A:
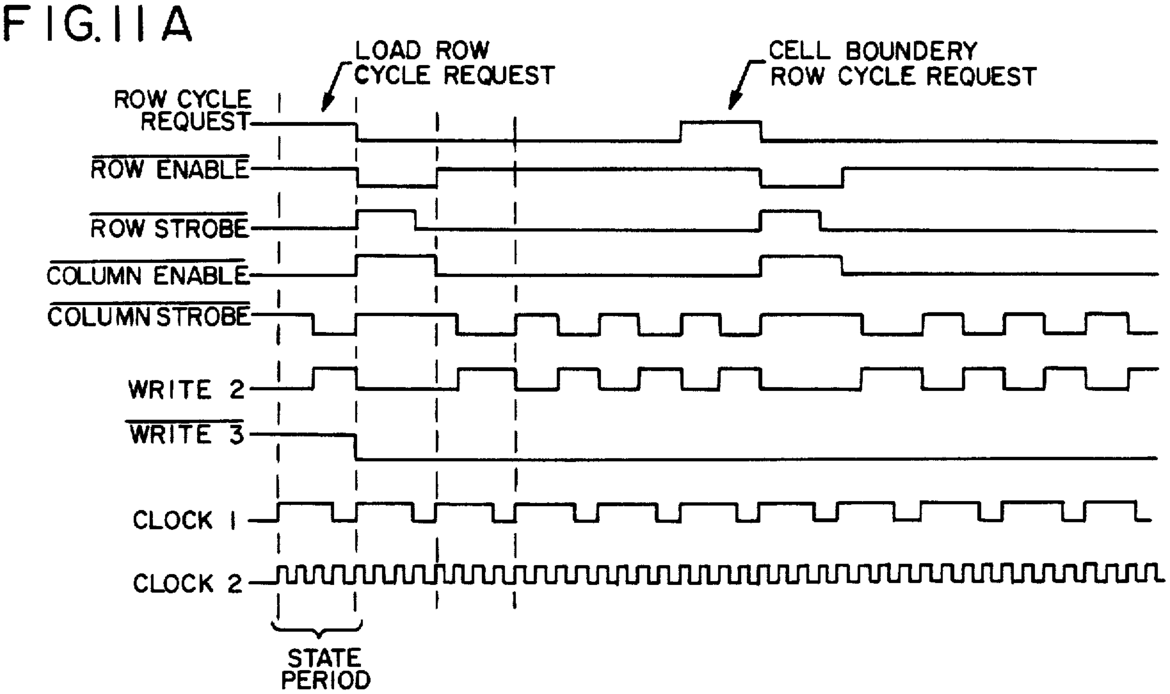
FIGS. 11A and 11B show timing diagrams for the operation of the memory cycle controller portion of the preferred embodiment.

As shown by the Page Mode Memory Cycle Timing Diagram, FIG. 11A, the occurrence of a ROW CYCLE REQUEST resulting from an address load generates a ROW ENABLE, a RAS, a COLUMN ENABLE, and a CAS. Assuming that a WRITE REQUEST has been received, a WRITE 3 signal 160 will be issued which, along with a periodic WRITE 2 signal 162, causes the write enable decoders 126 and 128 to issue a WE signal to the selected chip. In a case that a WRITE ALL signal 94 is also provided by the GCD, a WRITE 1 signal 164 is issued as well, which causes the decoders 126 and 128 to enable all sixteen RAM devices, thereby writing to corresponding storage locations in each device.

As long as the controller remains in state 3, which will be the case until it receives a ROW CYCLE REQUEST or a BLANKING signal, it will continue to issue a COLUMN ENABLE and periodic column address strobe signals. The occurrence of a WRITE REQUEST will therefore cause data to be written in each new address presented by the GCD. Upon occurrence of a cell boundary crossing, the controller moves to state 2, issues ROW ENABLE and a RAS, moves back to state 3 and the process continues as shown by the timing diagram.

Although the period of a state is determined by the CLOCK 1 signal 140, four sub-periods required by the logic shown in FIG. 8 are produced by a CLOCK 2 signal 164 derived from an appropriate source, which is four times as fast as the CLOCK 1 signal, and by the 4-bit counter 142. In this particular embodiment, a GCD clock 166 is also derived from the logic of FIG. 8 and is used to time the X and Y counters 42 and 44, respectively, the data input flip-flop 134, and the GCD itself. It is to be understood that a GCD could readily be designed which does not derive its clock from the memory cycle controller. However, to avoid memory contention the GCD clock is shut off during the simultaneous occurrence of a WRITE REQUEST or a READBACK REQUEST and a BLANKING signal, and it is preferable that some signal be sent to the GCD to provide this function. In addition, while FIG. 3 shows the DRRAG 38 issuing an address directly to the RAM address bus 34 for illustrative purposes, which could be done, the preferred embodiment described herein actually contemplates that the addresses provided by the X and Y counters and the addresses provided by the DRRAG be input via the same circuit to the address multiplexer. Consequently, the controller provides a GCD ADDRESS ENABLE signal 168 to the address counters and a DISPLAY REFRESH ADDRESS ENABLE signal 170 to the DRRAG for placing their respective address signals on the input circuit to the address multiplexer 36 when needed.

Figure 11B:
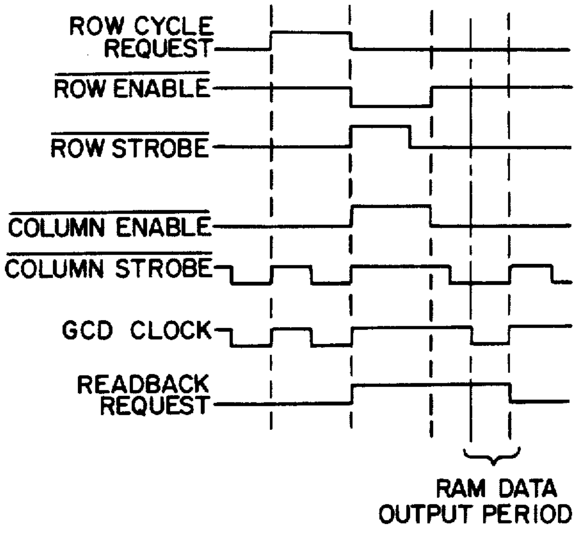

Referring again particularly to FIGS. 3 and 10, a screen readback shift register 98 of the preferred embodiment comprises two 8-bit shift registers 172 and 174. To read back a set of data corresponding to adjacent pixels of the display, the GCD loads an address into the address counters, which causes a ROW CYCLE REQUEST 56 to be produced and issues a READBACK REQUEST 100. Provided that a BLANKING signal has not been received the controller moves to state 2, and issues ROW ENABLE, RAS, COLUMN ENABLE, and CAS signals which read corresponding locations in all sixteen RAM devices, as shown in the readback timing diagram of FIG. 11B, and the data therefrom are loaded into the shift registers 172 and 174 in response to readback commands 102 from the GDC. Thereafter, the data in the screen readback shift register 98 may be shifted out or circulated as requested by readback commands 102. In the preferred embodiment data is actually read out from and circulated separately in shift registers 172 and 174.

Although a variety of different devices might be utilized to implement the circuitry disclosed herein, or variations thereof, some specific devices which will work in the afore-described preferred embodiment are listed in Table 2 hereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

TABLE 1

READ ONLY MEMORY 136 CODING

| Address ADA-ADF (Octal) | Output DO8 | DO7 | DO6 | DO5 | DO4 | DO3 | DO2 | DO1 |
|---|---|---|---|---|---|---|---|---|
| 0 | 0 | 0 | 0 | 0 | 1 | 0 | 0 | 1 |
| 1 | 0 | 1 | 1 | 0 | 0 | 1 | 1 | 0 |
| 2 | 0 | 0 | 0 | 0 | 0 | 0 | 1 | 1 |
| 3 | 0 | 1 | 1 | 0 | 0 | 1 | 1 | 0 |
| 4 | 0 | 1 | 1 | 0 | 0 | 1 | 1 | 0 |
| 5 | 0 | 1 | 1 | 0 | 0 | 1 | 1 | 0 |
| 6 | 0 | 0 | 0 | 0 | 0 | 1 | 1 | 1 |
| 7 | 0 | 1 | 1 | 0 | 0 | 1 | 1 | 0 |
| 10 | 0 | 0 | 0 | 0 | 1 | 0 | 0 | 1 |
| 11 | 0 | 1 | 1 | 0 | 0 | 1 | 1 | 0 |
| 12 | 0 | 0 | 0 | 0 | 0 | 1 | 0 | 0 |
| 13 | 0 | 1 | 1 | 0 | 0 | 1 | 1 | 0 |
| 14 | 0 | 1 | 1 | 0 | 0 | 1 | 1 | 0 |
| 15 | 0 | 1 | 1 | 0 | 0 | 1 | 1 | 0 |
| 16 | 0 | 0 | 0 | 0 | 0 | 1 | 1 | 1 |
| 17 | 0 | 1 | 1 | 0 | 0 | 1 | 1 | 0 |
| 20 | 0 | 0 | 0 | 0 | 1 | 0 | 0 | 1 |
| 21 | 0 | 1 | 1 | 0 | 0 | 1 | 1 | 0 |
| 22 | 0 | 0 | 0 | 0 | 0 | 0 | 1 | 1 |
| 23 | 0 | 1 | 1 | 0 | 0 | 1 | 1 | 0 |
| 24 | 0 | 1 | 1 | 0 | 0 | 1 | 1 | 0 |
| 25 | 0 | 1 | 1 | 0 | 0 | 1 | 1 | 0 |
| 26 | 0 | 0 | 0 | 0 | 0 | 1 | 1 | 1 |
| 27 | 0 | 1 | 1 | 0 | 0 | 1 | 1 | 0 |
| 30 | 0 | 0 | 0 | 0 | 1 | 0 | 0 | 1 |
| 31 | 0 | 1 | 1 | 0 | 0 | 1 | 1 | 0 |
| 32 | 0 | 0 | 0 | 0 | 0 | 1 | 0 | 0 |
| 33 | 0 | 1 | 1 | 0 | 0 | 1 | 1 | 0 |
| 34 | 0 | 1 | 1 | 0 | 0 | 1 | 1 | 0 |
| 35 | 0 | 1 | 1 | 0 | 0 | 1 | 1 | 0 |
| 36 | 0 | 0 | 0 | 0 | 0 | 1 | 1 | 1 |
| 37 | 0 | 1 | 1 | 0 | 0 | 1 | 1 | 0 |
| 40 | 0 | 0 | 0 | 0 | 1 | 0 | 0 | 1 |
| 41 | 0 | 1 | 1 | 0 | 0 | 0 | 1 | 0 |
| 42 | 0 | 0 | 0 | 0 | 0 | 0 | 1 | 1 |
| 43 | 0 | 0 | 1 | 0 | 0 | 0 | 1 | 1 |
| 44 | 0 | 1 | 1 | 0 | 1 | 0 | 0 | 0 |
| 45 | 0 | 1 | 1 | 0 | 1 | 0 | 0 | 0 |
| 46 | 0 | 0 | 0 | 0 | 0 | 1 | 1 | 1 |
| 47 | 0 | 1 | 1 | 0 | 0 | 0 | 1 | 0 |
| 50 | 0 | 0 | 0 | 0 | 1 | 0 | 0 | 1 |
| 51 | 0 | 1 | 1 | 0 | 1 | 0 | 0 | 0 |
| 52 | 0 | 0 | 0 | 0 | 0 | 1 | 0 | 0 |
| 53 | 0 | 0 | 1 | 0 | 0 | 1 | 0 | 0 |
| 54 | 0 | 1 | 1 | 0 | 1 | 0 | 0 | 0 |
| 55 | 0 | 1 | 1 | 0 | 1 | 0 | 0 | 0 |
| 56 | 0 | 0 | 0 | 0 | 0 | 1 | 1 | 1 |
| 57 | 0 | 1 | 1 | 0 | 0 | 0 | 1 | 0 |
| 60 | 0 | 0 | 0 | 0 | 1 | 0 | 0 | 1 |
| 61 | 0 | 1 | 1 | 0 | 0 | 0 | 1 | 0 |
| 62 | 0 | 0 | 0 | 0 | 0 | 0 | 1 | 1 |
| 63 | 0 | 1 | 1 | 0 | 0 | 0 | 1 | 0 |
| 64 | 0 | 1 | 1 | 0 | 1 | 0 | 0 | 0 |
| 65 | 0 | 1 | 1 | 0 | 1 | 0 | 0 | 0 |
| 66 | 0 | 0 | 0 | 0 | 0 | 1 | 1 | 1 |
| 67 | 0 | 1 | 1 | 0 | 0 | 0 | 1 | 0 |
| 70 | 0 | 0 | 0 | 0 | 1 | 0 | 0 | 1 |
| 71 | 0 | 1 | 1 | 0 | 1 | 0 | 0 | 0 |
| 72 | 0 | 0 | 0 | 0 | 0 | 1 | 0 | 0 |
| 73 | 0 | 1 | 0 | 0 | 0 | 1 | 0 | 1 |
| 74 | 0 | 1 | 1 | 0 | 1 | 0 | 0 | 0 |
| 75 | 0 | 1 | 1 | 0 | 1 | 0 | 0 | 0 |
| 76 | 0 | 0 | 0 | 0 | 0 | 1 | 1 | 1 |
| 77 | 0 | 1 | 1 | 0 | 0 | 0 | 1 | 0 |

TABLE 2

| Item Numbers | Description | Source/ Nomenclature |
|---|---|---|
| 108 | 65,536-bit dynamic random access memory | TMS4164JDL |
| 114 | synchronous 4-bit up/ down counter | SN74LS169A |
| 116, 118, 120, 122, 124 | 4-bit up/down counter, 3-state output | AM25LS2569 |
| 126, 128 | one-of-eight decoder, | AM25LS2538 |

TABLE 2-continued

| Item Numbers | Description | Source/ Nomenclature |
|---|---|---|
| | 3-state output | |
| 130, 132 | octal dynamic memory driver, 3-state output | AM2966 |
| 134, 138 | octal D-type flip-flows with enable | SN74LS377 |
| 136 | 256 word × 8-bit programmable read-only memory | 74LS471 |
| 142 | synchronous 4-bit counter | SN74S163 |
| 144, 146 | dual 4-line-to-1-line data selector/multiplexer | AN74S153 |
| 148 | data selector/multiplexer | SN74S151 |
| 150 | octal D-type transparent latches and edge triggered flip-flops | SN74S374 |
| 152 | decoder/multiplexer | SN74LS139 |
| 156, 158, 172, 174 | 8-bit universal shift/ storage register | SN74LS299 |

AM = Advanced Micro Devices, Inc., Sunnyvale, California.
TMS.SN = Texas Instruments Incorporated, Dallas, Texas.

What is claimed is:

1. A memory for use with a graphics display system having a display with two or more dimensions, said memory comprising:

(a) storage means for storing data representative of an image to be displayed, said storage means having a plurality of data storage locations corresponding to respective points of said display, each said data storage location having first and second storage addresses representing row and column addresses within said storage means, said storage means requiring that both said storage addresses be provided thereto sequentially to access an arbitrary storage location therein but permitting access to storage locations which share a common first storage address more rapidly by maintaining said first storage address continuously while said second storage address is provided anew than by providing both said first and said second storage addresses anew to access a data storage location;

(b) first address means for providing to said storage means and continuously maintaining a first storage address for sequential access to a memory cell which comprises a plurality of said data storage locations which share a common first storage address, said common first storage address providing access to a single row within said storage means; and (c) second address means for mapping said data storage locations within said memory cell to correspond to points distributed in two or more dimensions of said display.

2. The memory of claim 1 wherein said first address means comprises a first display address register for receiving predetermined most significant bits of a first display address, a second display address register for receiving predetermined most significant bits of a second display address, and row address means for combining bits in said first display address register with bits in said second display address register to provide to said storage means said first storage address.

3. The memory of claim 2 wherein said second address means comprises a third display address register means for receiving predetermined least significant bits of said first display address, a fourth display address register means for receiving predetermined least significant bits of said second display address, and column address means for combining bits in said third address register means with bits in said fourth display address register means to provide to said storage means said second storage address.

4. The memory of claim 3 wherein said first display address register means and said third display address register means comprises upper and lower adjacent sections, respectively, of a first counter and said second display address register means and said fourth display address register means comprise upper and lower adjacent sections, respectively, of a second counter, said first and second counters being responsive to one or more count signals for incrementing or decrementing addresses therein and including respective means for generating a carry signal from the lower section to the upper section thereof, said memory further comprising carry detector means responsive to said first and second counter means for causing said storage means to accept a new first storage address upon the generation of a carry signal by either of said counters.

5. The memory of claim 4 wherein said carry detector means includes means responsive to one or more load address signals for causing said storage means to receive a new first storage address upon the loading of a new display address to either of said first or second counters.

6. The memory of claim 2 comprising a plurality of said storage means, wherein said second address means comprises a third display address register means for receiving predetermined least significant bits of said first display address and decoder means, associated with said plurality of said storage means and said third display address register means, for selecting one or more storage means from said plurality of storage means based upon bits in said third display address register means.

7. The memory of claim 6 wherein said second address means further comprises a fourth address register means for receiving predetermined least significant bits of said second display address, and column address means for combining bits in said fourth display address register means and selected bits in said second display address register means to provide to said plurality of storage means said second storage address.

8. The memory of claim 1 wherein said second address means comprises a third display address register means for receiving predetermined least significant bits of said first display address, a fourth display address register means for receiving predetermined least significant bits of said second display address, and column address means for combining bits in said third display address register means with bits in said fourth display address register means to provide to said storage means said second storage address.

9. The memory of claim 1 comprising a plurality of said storage means, wherein said second address means comprises a third display address register means for receiving predetermined least significant bits of said first display address and decoder means, associated with said plurality of said storage means and said third display address register means, for selecting one or more storage means from said plurality of storage means based upon bits in said third display address register means.

10. The memory of claim 1, comprising a plurality of said storage means and readback register means associated with said storage means for reading out and storing data from corresponding locations in a plurality of said storage means simultaneously, said readback register means being responsive to command signals for serially outputting data stored therein.

11. The memory of claim 10 wherein said readback register means includes means responsive to said command signals for outputting said stored data in a plurality of selected orders.

12. The memory of claim 1, comprising a plurality of said storage means and means associated with said storage means for simultaneously enabling a selected plurality of said storage means for writing data into a storage location in each said selected storage means.

13. The memory of claim 12, wherein the storage locations into which data is written simultaneously correspond to contiguous pixels of said display.

14. The memory of claim 1, comprising a plurality of said storage means, output register means associated with said plurality of storage means for storing data read out from corresponding locations in a plurality of said storage mans, said data corresponding to contiguous pixels along one dimension of said display, and means associated with said storage means for simultaneously reading said data out, said output register means being responsive to a clock signal for serially outputting said data to produce a video raster display signal.

15. A method for addressing a display memory in a graphics display system having a display with two or more display dimensions, each point of the display having two or more display addresses corresponding respectively to said display dimensions, said display memory having storage means comprising a plurality of data storage locations corresponding to respective points of said display, each said data storage location having first and second storage addresses representing row and column addresses within said storage means, said storage means requiring that both said storage addresses be provided thereto sequentially to access an arbitrary data storage location therein but permitting access to data storage locations which share a common first storage address more rapidly by maintaining said first storage address continuously while said second storage address is provided anew than by providing both said first and said second addresses anew to access a data storage location, said method comprising:

(a) providing to said storage means a first storage address for sequential access to a memory cell which comprises a plurality of said data storage locations which share a common first storage address, said common first storage address providing access to a single row within said storage means;

(b) maintaining said first storage address for sequential access to said data storage locations of which said memory cell is comprised; and (c) while said first storage address is being maintained, providing to said storage means a sequence of second storage addresses for storage locations within said storage means which share said common first storage address and are mapped to points distributed in two or more dimensions of said display.

16. The method of claim 15, further comprising providing a sequence of combinations of first and second display addresses, each combination corresponding to a point of said display, and providing said second storage address based upon a combination of predetermined least significant bits of said first display address and predetermined least significant bits of said second display address.

17. The method of claim 16, further comprising providing said first storage address based upon the remaining bits of said first and second display addresses.

18. The method of claim 17, further comprising providing a new first storage address in response to any change in the remaining bits of either said first or second display addresses in said sequence of display addresses.

19. The method of claim 15, further comprising providing a sequence of combinations of first and second display addresses, each combination corresponding to a point of said display, and providing said first storage address based upon a combination of predetermined most significant bits of said first display address and predetermined most significant bits of said second display address.

20. The method of claim 15 wherein said display memory comprises a plurality of said storage means, said method further comprising providing a sequence of combinations of first and second display addresses, each combination corresponding to a point of said display, providing a first portion of said second storage address based upon a predetermined number of least significant bits of said second display address, and enabling one of said plurality of storage means based upon a predetermined number of least significant bits of said first display address.

21. The method of claim 20, further comprising providing a new first storage address in response to any change in the remaining bits of either said first or second display addresses.

22. The method of claim 15 wherein said display memory comprises a plurality of said storage means, said method further comprising providing a sequence of combinations of first and second display addresses, each combination corresponding to a point of said display, providing a first portion of said second storage address based upon a predetermined number of least significant bits of said second display address, and selectively enabling a plurality of said storage means simultaneously for writing data therein.

23. The method of claim 15 wherein said display memory comprises a plurality of said storage means, said method further comprising reading data out of selected storage locations in said plurality of said storage means simultaneously and storing said data in a separate register means.

* * * * *